United States Patent [19]
Tomita

[11] Patent Number: 5,384,789
[45] Date of Patent: Jan. 24, 1995

[54] SEMICONDUCTOR MEMORY DEVICE HAVING ECC CIRCUIT FOR DECREASING THE NUMBER OF COMMON BUS LINES TO REALIZE LARGE SCALE INTEGRATION AND LOW POWER CONSUMPTION

[75] Inventor: Hiroyoshi Tomita, Kawasaki, Japan

[73] Assignee: Fujitsu Limited, Kawasaki, Japan

[21] Appl. No.: 12,644

[22] Filed: Feb. 3, 1993

[30] Foreign Application Priority Data

Feb. 4, 1992 [JP] Japan .................. 4-018784

[51] Int. Cl.6 .............................................. G06F 11/10
[52] U.S. Cl. .................................................. 371/40.1
[58] Field of Search ............... 371/40.1, 40.2, 40.3, 371/40.4, 38.1, 39.1, 37.3, 3, 21.1

[56] References Cited

U.S. PATENT DOCUMENTS

| | | | |
|---|---|---|---|
| 4,903,268 | 2/1990 | Hidaka et al. | 371/40.1 |
| 5,012,472 | 4/1991 | Arimoto et al. | 371/40.1 |
| 5,056,089 | 10/1991 | Furuta et al. | 371/3 |
| 5,233,610 | 8/1993 | Nakayama et al. | 371/40.1 |

*Primary Examiner*—Hoa T. Nguyen
*Attorney, Agent, or Firm*—Armstrong, Westerman, Hattori, McLeland & Naughton

[57] ABSTRACT

A semiconductor memory device has a cell and amplifier portion, a syndrome generation circuit, an error checking and correction circuit, and a plurality of memory control blocks. The cell and amplifier portion has a memory cell array, a sense amplifier array, and a column gate array, and each of the memory control blocks has a data bus amplifier, a write amplifier, and a syndrome decoder circuit which decodes syndrome output from the syndrome generation circuit. Consequently, an occupancy area can be reduced by decreasing the number of wiring lines, and a large scale integration and a low power consumption can be realized.

3 Claims, 11 Drawing Sheets

SEMICONDUCTOR MEMORY DEVICE HAVING ECC CIRCUIT FOR DECREASING THE NUMBER OF COMMON BUS LINES TO REALIZE LARGE SCALE INTEGRATION AND LOW POWER CONSUMPTION

BACKGROUND OF THE INVENTION

1. Field of the Invention

The present invention relates to a semiconductor memory device, and more particularly, to a dynamic random access memory device having an error checking and correction circuit.

2. Description of the Related Art

Recently, in accordance with an increase in storage capacity of dynamic random access memory (DRAM) devices, an error checking and correction (ECC) circuit has been provided for the DRAM device to realize high reliability. This ECC circuit is used to detect (check) and correct an error bit of data stored in the DRAM device by an error correction code generated by using syndrome, and the like.

In the above DRAM devices, an ECC circuit, a syndrome generation circuit, and a syndrome decoder circuit are, for example, positioned at the center of a chip, data output from the data bus amplifiers are transferred to the syndrome generation circuit through the common data bus lines, and data correction signals output from the ECC circuit are transferred to the write amplifiers through the common data bus lines. Note, the number of the common data bus lines is so large, e.g., 64, that an occupancy area of the common data bus lines becomes large. Further, the common data bus line is provided so long (for example, one side of the chip, e.g., 10 mm), that the capacitance of each common data bus line becomes large and driving currents thereof becomes large. Consequently, in the above DRAM device, a large scale integration cannot be realized and power consumption becomes large.

SUMMARY OF THE INVENTION

An object of the present invention is to provide a semiconductor memory device which can reduce an occupancy area by decreasing the number of wiring lines (common bus lines) and realize a large scale integration and low power consumption.

According to the present invention, there is provided a semiconductor memory device comprising a cell and amplifier portion having a memory cell array, a sense amplifier array, and a column gate array, a syndrome generation circuit for generating syndrome of an output data, an error checking and correction circuit for correcting an error of the output data, and a plurality of memory control blocks each having a data bus amplifier for reading data from the memory cell array, a write amplifier for writing data into the memory cell array, and a first syndrome decoder circuit for decoding syndrome output from the syndrome generation circuit.

The semiconductor memory device may further comprise a second syndrome decoder circuit for decoding the syndrome output from the syndrome generation circuit, and the error checking and correction circuit may correct the output data in accordance with an output signal of the second syndrome decoder circuit. Each of the memory control blocks may comprise a write data control unit for generating a data inversion control signal to invert and write data into the memory cell array by the write amplifier in accordance with an inversion requiring signal output from the first syndrome decoder circuit and a write enable signal from an external source.

The write data control unit may control selectively enabling the write amplifier to which a data inversion is required in accordance with the data inversion control signal. The syndrome generation circuit may be formed under a portion of the common data bus lines in a longitudinal direction. The semiconductor memory device may be a dynamic random access memory device, and each memory cell of the memory cell array comprises a transistor and a capacitor.

BRIEF DESCRIPTION OF THE DRAWINGS

The present invention will be more clearly understood from the description of the preferred embodiments as set forth below with reference to the accompanying drawings, wherein:

FIG. 1, consisting of FIGS. 1A and 1B, is a block diagram showing an example of a semiconductor memory device according to the prior art;

DESCRIPTION OF THE PREFERRED EMBODIMENTS

For a better understanding of the preferred embodiments, the problems of the related art will now be explained, with reference to FIGS. 1 to 4.

Figure 1A:
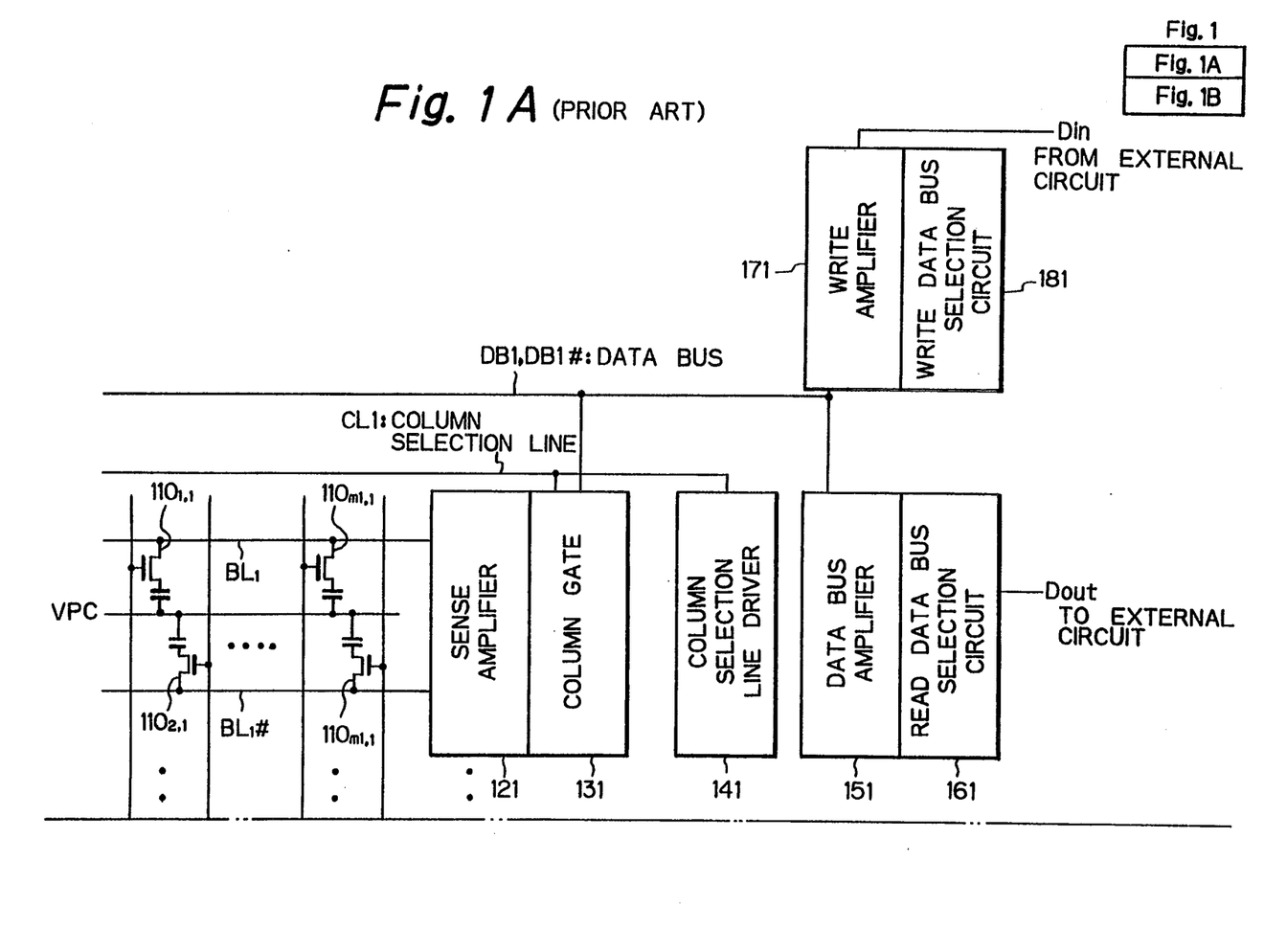
Figure 1B:
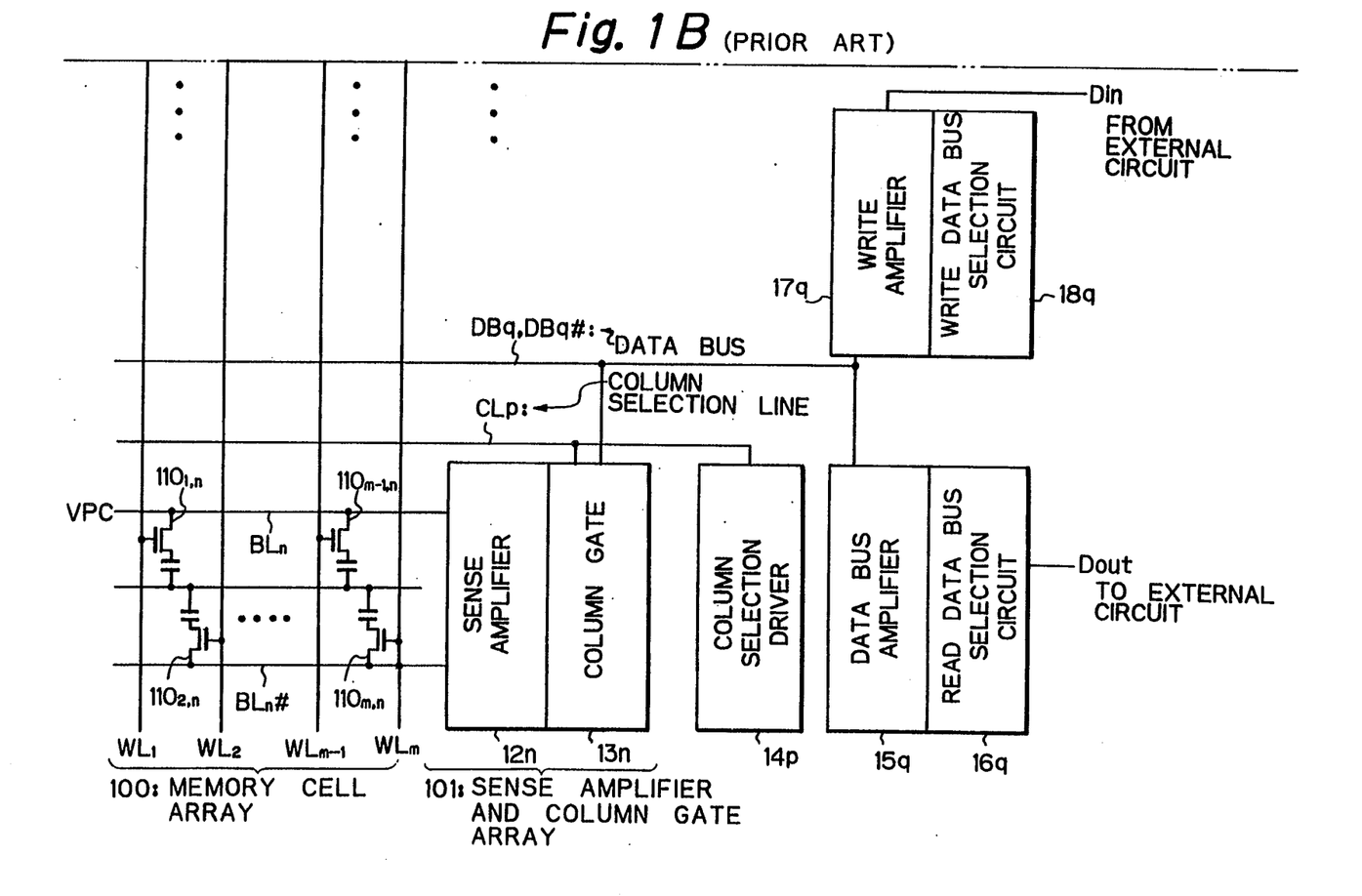

FIG. 1, which consists of FIGS. 1A and 1B, shows an example of a semiconductor memory device, more particularly, FIG. 1 shows an example of a DRAM device. In FIG. 1 (FIGS. 1A and 1B), references $WL_1$ to $WL_m$ denote word lines, $BL_1$ to $BL_m$ and $BL_1\#$ to $BL_m\#$ denote bit lines, $DB_l$, $DB_l\#$ to $DB_m$, $DB_m\#$ denote data bus lines, and $CL_1$ to $CL_m$ denote column selection lines. Note, the reference "#" denotes an inverted signal line, concretely, the bit lines $BL_l$ and $BL_l\#$ denote complementary bit lines, and the data bus lines $DB_l$ and $DB_l\#$ denote complementary data bus lines.

Further, in FIG. 1, reference numerals $110_{l,l}$ to $110_{m,m}$ denote memory cells, 121 to 12n denote sense amplifiers, 131 to 13n denote column gates, 141 to 14p denote column selection line drivers, 151 to 15q denote data bus amplifiers, 161 to 16q denote read data bus selection circuits, 171 to 17q denote write amplifiers, and 181 to 18q denote write data bus selection circuits. Note, reference numeral 100 denotes a memory cell array having a plurality of memory cells $110_{l,1}$ to $110_{m,n}$ and 101 denotes a sense amplifier and column gate array having a plurality of sense amplifiers 121 to 12n and a plurality of column gates 131 to 13n.

As shown in FIG. 1, a pair of bit lines (complementary bit lines) are connected to each corresponding sense amplifier, and one memory cell is connected between each word line and each bit line, respectively. Concretely, a pair of bit lines $BL_l$ and $BL_l\#$ are connected to a first sense amplifier 121, and a memory cell $110_{l,1}$ is connected between a word line $WL_l$ and a bit line $BL_l$. Further, another pair of bit lines $BL_m$ and $BL_m\#$ are connected to a n-th sense amplifier 12n, and another memory cell $110_{m,n}$ is connected between a word line $WL_n$ and a bit line $BL_m\#$. Note, for example, the number n of the sense amplifiers 121 to 12n and column gates 131 to 13n is specified as 4096, the number p of the column selection line drivers 141 to 14p is specified as 2048, and the number q of the data bus amplifiers 151 to 15q and read data bus selection circuits 161 to 16q (write amplifiers 171 to 17q and write data bus selection circuits 181 to 18q) is specified as 64 or 32.

In the above semiconductor memory device (DRAM device) shown in FIG. 1, when a reading operation is carried out, the column selection lines $CL_l$ to $CL_m$ are selectively activated, and data is transferred to data bus lines (complementary data bus lines) DBi, DBi# through a sense amplifier 12i corresponding to a selected column gate 13i. Further, the data of the data bus lines DBi, DBi# is output to a destination external to the, semiconductor memory device (external to the chip) through a data bus amplifier 15i corresponding to the selected column gate 13i. On the other hand, when a write operation is carried out, data input from the external is supplied to a write amplifier 17i which is selected by the write data bus selection circuits 181 to 18q, and the data is written into a memory cell through the data bus lines DBi, DBi# and sense amplifier 12i corresponding to the selected column gate 13i. Note, a reference "i" denotes a selected column number, and thus the sense amplifier 12i is determined as a single selected sense amplifier of all of the sense amplifiers 121 to 12n and the write amplifier 17i is determined as a single selected write amplifier of all of the write amplifiers 171 to 17q.

Figure 2:
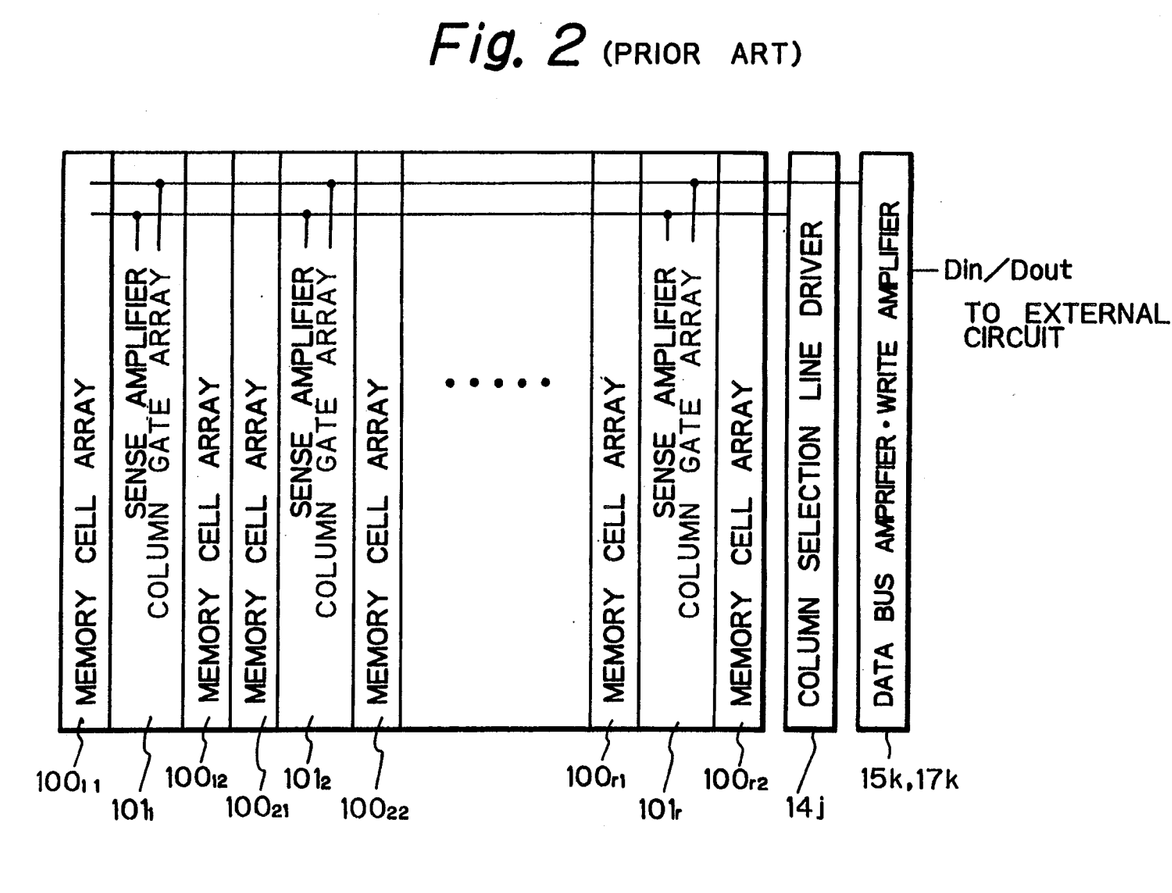
FIG. 2 is a block diagram showing a typical arrangement of the semiconductor memory device.

FIG. 2 shows a typical arrangement of the semiconductor memory device. In FIG. 2, reference numerals $100_{11}$, $100_{12}$ to $100_{r1}$, $100_{r2}$ denote memory cell arrays each having a plurality of memory cells $110_{l,1}$ to $110_{m,n}$, and $101_1$ to $101_r$ denote sense amplifier and column gate arrays each including a plurality of sense amplifiers 121 to 12n and column gates 131 to 13n.

As shown in FIG. 2, two memory cell arrays $100_{11}$ and $100_{12}$ ($100_{r1}$ and $100_{r2}$) are provided for each sense amplifier and column gate array $101_1$ ($101_r$) at both sides thereof. Further, one column selection line driver 14j and one data bus amplifier/write amplifier 17k, 15k are commonly provided for the memory cell arrays $100_{11}$, $100_{12}$ to $100_{r1}$, $100_{r2}$ and the sense amplifier and column gate arrays $101_1$ to $101_r$.

Figure 3:
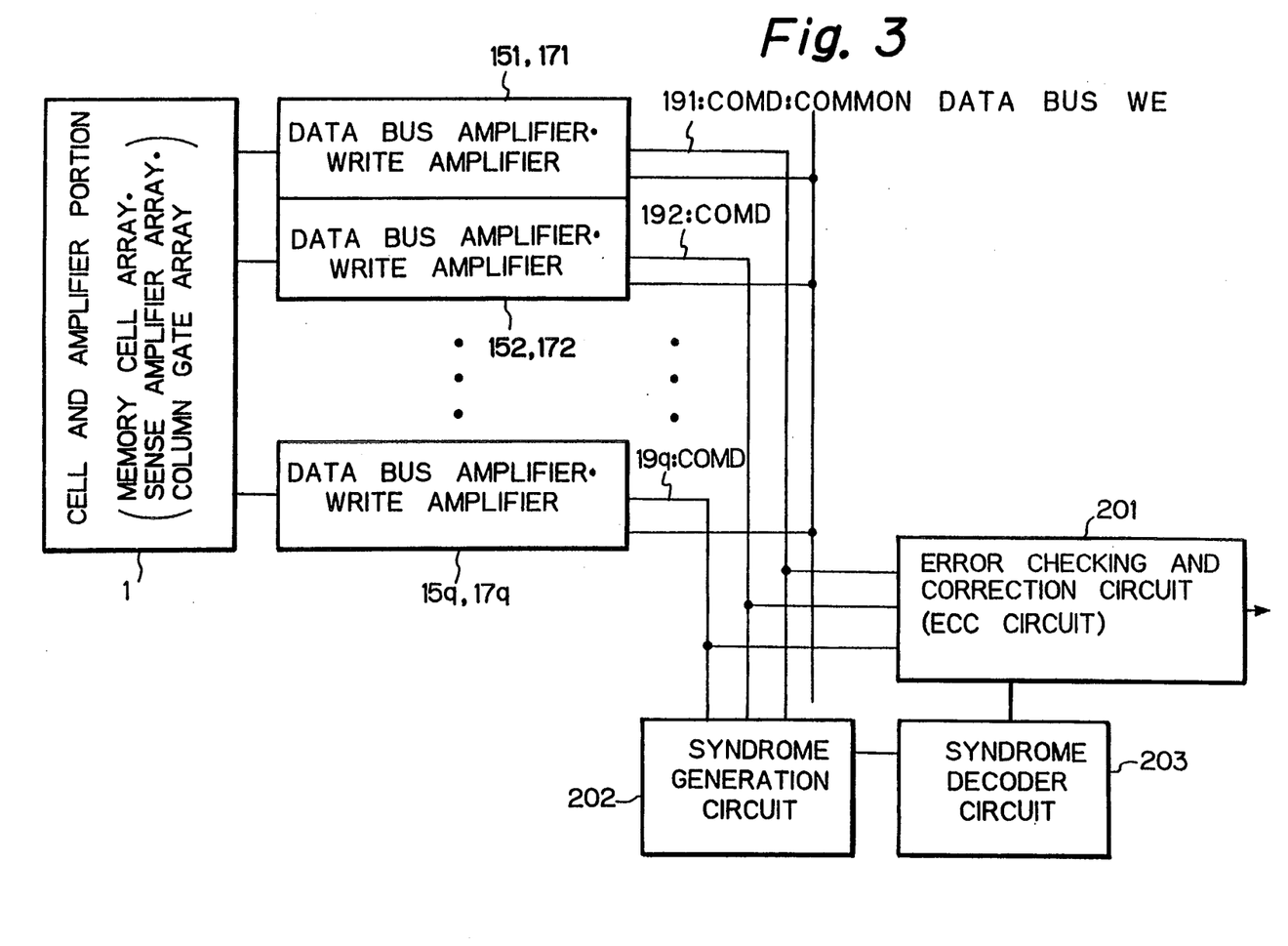
FIG. 3 is a block diagram showing an example of a semiconductor memory device according to the related art.
Figure 4:
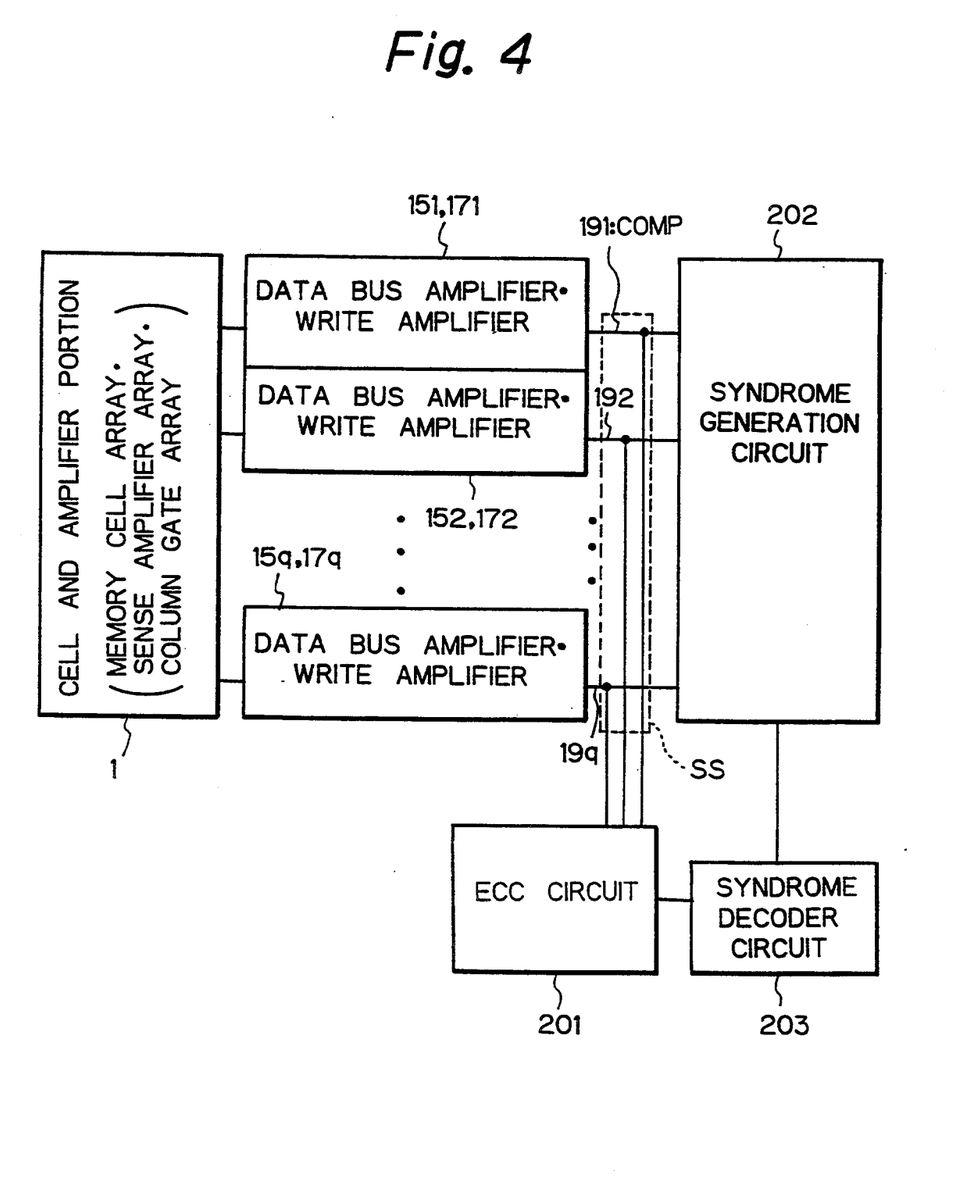
FIG. 4 is a block diagram showing another example of a semiconductor memory device according to the related art.

FIG. 3 shows an example of a semiconductor memory device, and FIG. 4 shows another example of a semiconductor memory device according to the related art. As shown in FIGS. 3 and 4, each semiconductor memory device (DRAM device) includes an error checking and correction circuit (ECC circuit).

In FIGS. 3 and 4, reference numeral 1 denotes a cell and amplifier portion, 201 denotes an ECC circuit, 202 denotes a syndrome generation circuit, 203 denotes a syndrome decoder circuit, and 191 to 19q denote common data bus lines (COMD). The cell and amplifier portion 1 comprises a plurality of memory cells $110_{l,1}$ to $110_{m,n}$ (memory cell array 100), a plurality of memory sense amplifiers 121 to 12n (sense amplifier array 101), and a plurality of column gates 131 to 13n (column gate array 101).

In the semiconductor memory device shown in FIG. 3, the ECC circuit 201, the syndrome generation circuit 202, and the syndrome decoder circuit 203 are, for example, positioned at the center of a chip (semiconductor memory device), data output from the data bus amplifiers 151 to 15q are transferred to the syndrome generation circuit 202 through the common data bus lines 191 to 19q, and data correction signals output from the ECC circuit 201 are transferred to the write amplifiers 171 to 17q through the common data bus lines 191 to 19q.

In the semiconductor memory device shown in FIG. 4, the syndrome generation circuit 202 is formed along an array of the data bus amplifiers 151 to 15q and the write amplifiers 171 to 17q (longitudinal direction), and syndrome is generated by the syndrome generation circuit 202 in the longitudinal direction. Note, the syndrome generation circuit 202 can be formed under a portion SS of the common data bus lines 191 to 19q in a longitudinal direction.

In the above semiconductor memory devices shown in FIGS. 3 and 4, the number q of the common data bus lines 191 to 19q is specified as 64 (or 32) which is the same as the word number of the ECC circuit 201, and thus an occupancy area of these common data bus lines 191 to 19q becomes large. Further, the common data bus line is provided so long (for example, one side of the chip, or 10 mm), that the capacitance of each common data bus line (191 to 19q) becomes large, and a driving current of the common data bus line must be large. Consequently, in the semiconductor memory devices shown in FIGS. 3 and 4, power consumption becomes large.

Further, when the syndrome decoder circuit 203 is positioned at the specific position (for example, the center position) of the chip to collectively carry out decoding operations of the syndrome, the bit corrected by the ECC circuit 201 cannot be confirmed in each amplifier portion (data bus amplifier/write amplifier 151, 171 to 15q, 17q). Therefore, all of the bits of the ECC circuit 201 must be written, and all of the write amplifiers 171 to 17q are activated when the error correction operation is carried out, so that power consumption becomes large.

Below, the preferred embodiments of a semiconductor memory device according to the present invention will be explained, with reference to the accompanying drawings.

Figure 5:
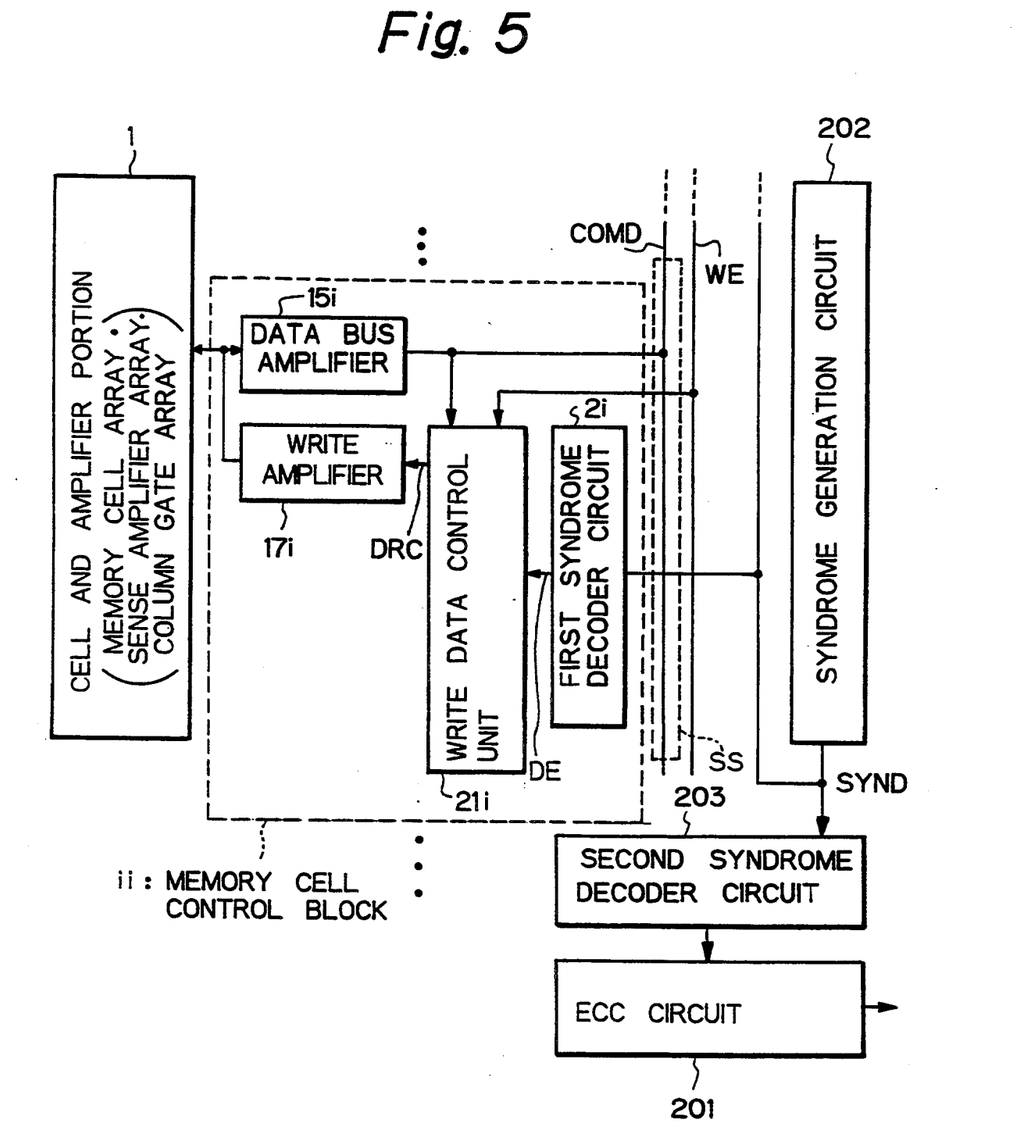
FIG. 5 is a block diagram showing an embodiment of a semiconductor memory device according to the present invention.

FIG. 5 shows an embodiment of a semiconductor memory device according to the present invention. In FIG. 5, reference numeral 1 denotes a cell and amplifier portion, 201 denotes an ECC circuit, 202 denotes a syndrome generation circuit, and 203 denotes a syndrome decoder circuit. Further, reference ii denotes a memory cell control block, 15i denotes a data bus amplifier, 17i denotes a write amplifier, 2i denotes a syndrome decoder circuit (first syndrome decoder circuit), and 21i denotes a write data control unit.

The cell and amplifier portion 1 comprises a plurality of memory cells $110_{l,l}$ to $110_{m,n}$ (memory cell array 100), a plurality of memory sense amplifiers 121 to 12n (sense amplifier array 101), and a plurality of column gates 131 to 13n (column gate array 101). The ECC circuit 201 and the syndrome decoder circuit 203 are, for example, positioned at the center of a chip (semiconductor memory device), and the syndrome generation circuit 202 is formed under a portion SS of common data bus lines (COMD) in a longitudinal direction.

In the semiconductor memory (DRAM) device shown in FIG. 5, the syndrome generation circuit 202 is used to generate syndrome of an output data, and the ECC circuit 201 is used to correct an error in the output data. As shown in FIG. 5, the memory cell control block ii (51 to 5g) comprises a data bus amplifier 15i (151 to 15g), a write amplifier 17i (171 to 17g), and a syndrome decoder circuit 2i (21 to 2g). The data bus amplifier 15i is used to read out data from the memory cell array $110_{ll}$ to $110_{mn}$ (cell and amplifier portion 1), the write amplifier 17i is used to write data into the memory cell array $110_{ll}$ to $110_{mn}$, and the syndrome decoder circuit 2i is used to decode syndrome (SYND) output from the syndrome generation circuit 202. Note, the syndrome decoder circuit (second syndrome decoder circuit) 203 is used to collectively carry out all decoding operations of the syndrome, or to decode total bits of the syndrome, but the syndrome decoder circuit (first syndrome decoder circuit) 2i is used to carry out one decoding operation corresponding to the memory cell control block ii, or to decode one bit of the syndrome.

In the above semiconductor memory devices shown in FIG. 5, the first syndrome decoder circuit 2i is provided for each memory cell control block ii, and output signal DE of the first syndrome decoder circuit 2i is supplied to the write data control unit 21i. Note, the output signal DE is the signal for requiring the inversion of cell data output from the data bus amplifier 15i, and the write data control unit 21i further receives a write enable signal WE supplied from the external of the chip. The write data control unit 21i generates a cell data inversion signal DRC in accordance with the signals WE and DE, and the write amplifier 17i rewrite inversion data into the specific memory cell by inputting the cell data inversion signal DRC.

In the semiconductor memory device shown in FIG. 5, the write amplifiers (17i) required to rewrite the inversion data are only activated, and the other write amplifiers are not activated, so that power consumption of the semiconductor memory device can be reduced. Further, the number of the common data bus lines (COMD) can be decreased, for example, the number of the common data bus lines is only specified as 8, and thus the number of the common data bus lines can be decreased from 64 (or 32) to 8, so that an occupancy area of the common data bus lines can be small and the total power consumption can be also decreased.

Further, in the above embodiment, the write data control unit 21i and the syndrome decoder circuit (first syndrome decoder circuit) 2i are further provided for each memory cell control unit ii, and an area for the write data control unit 21i and syndrome decoder circuit 2i is additionally required. Nevertheless, in the present embodiment, the number of common data bus lines (COMD) can be decreased from 64 (or 32) to 8, and the increased occupancy area of the write data control unit 21i and syndrome decoder circuit 2i is much smaller than the decreased occupancy area of the common data bus lines. Namely, according to the present embodiment, the total occupancy area can be decreased.

Figure 6:
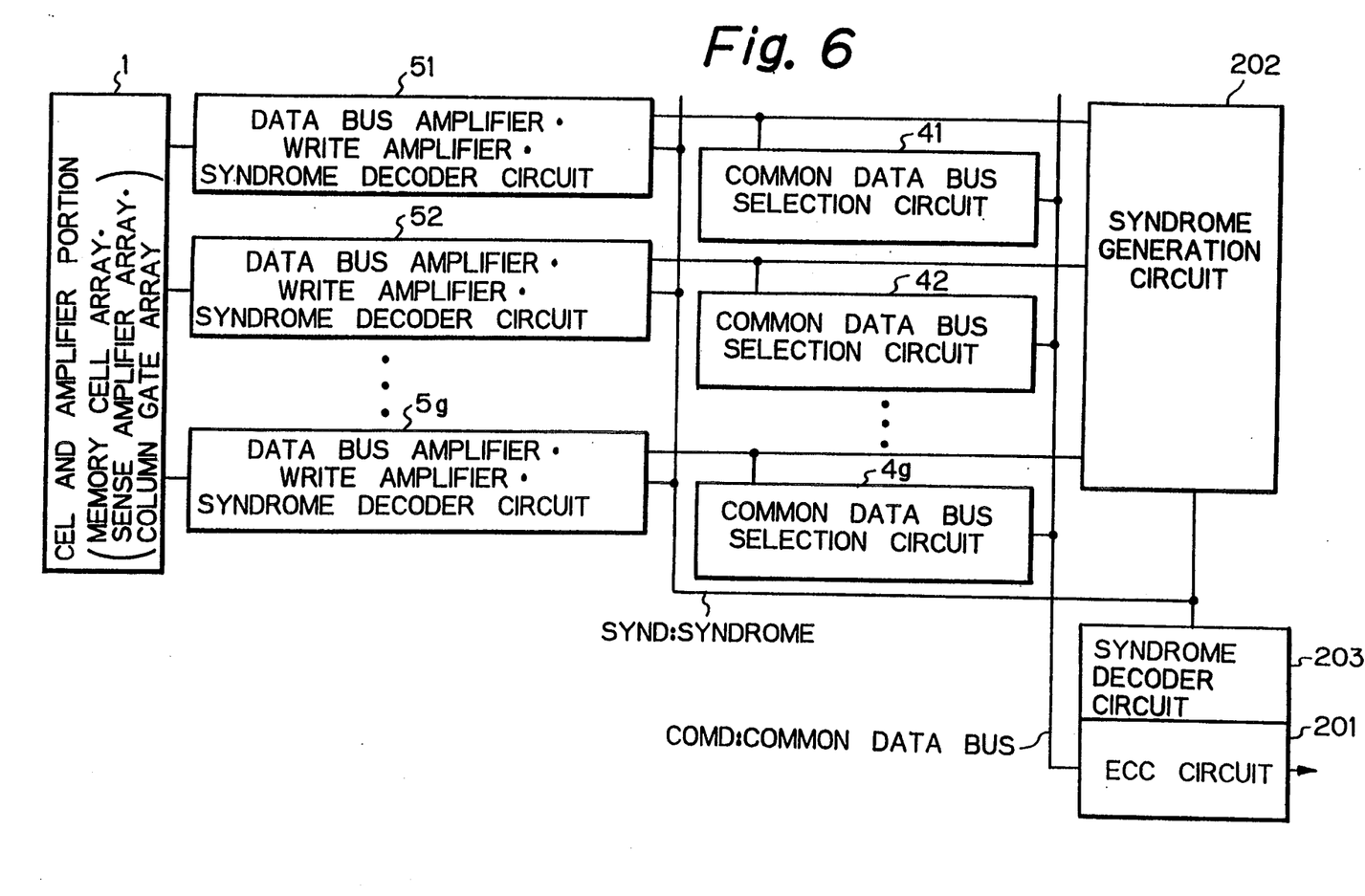
FIG. 6 is a block diagram showing another embodiment of a semiconductor memory device according the present invention.

FIG. 6 shows another embodiment of a semiconductor memory device according to the present invention. In FIG. 6, reference numerals 51 to 5g denote memory cell control blocks corresponding to the reference ii shown in FIG. 5, and 41 to 4g (4i) denote common data bus selection circuits.

As shown in FIG. 6, the semiconductor memory device comprises a cell and amplifier portion 1, an ECC circuit 201, a syndrome generation circuit 202, a syndrome decoder circuit 203, a plurality of memory cell control blocks 51 to 5g, and a plurality of common data bus selection circuits 41 to 4g. Note, the configuration of each memory cell control block 51 to 5g corresponds to the memory cell control block ii shown in FIG. 5. Further, the syndrome generation circuit 202 is formed under a portion (SS) of the common data bus lines COMD in a longitudinal direction.

In the semiconductor memory device shown in FIG. 6, only the write amplifiers required to rewrite the inversion data are activated, and the other write amplifiers are not activated, so that power consumption of the semiconductor memory device can be reduced. Further, the number of the common data bus lines can be decreased, for example, the number of the common data bus lines is only specified as 8, and thus the number of the common data bus lines can be decreased from 64 (or 32) to 8, so that an occupancy area of the common data bus lines can be small and the total power consumption can be also decreased.

Figure 7:
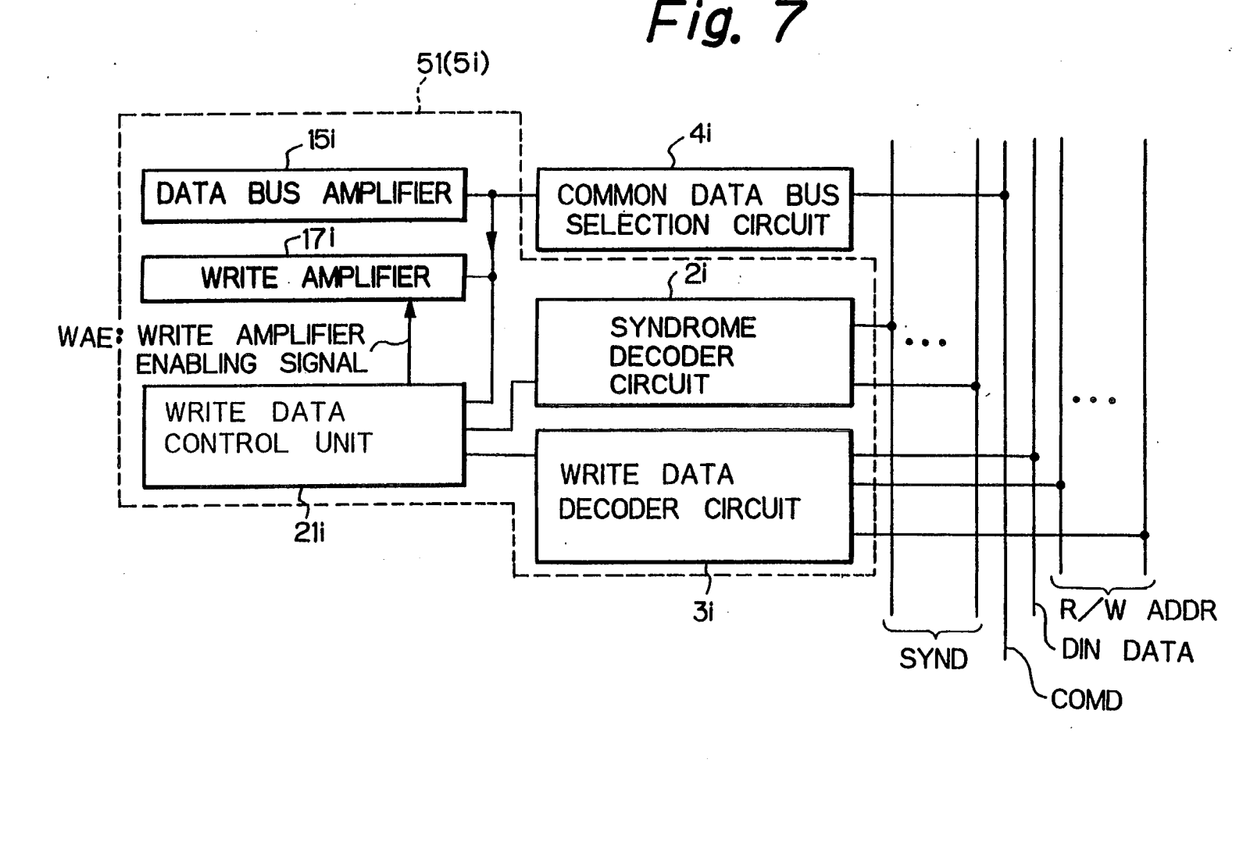
FIG. 7 is a block diagram showing a memory cell control block of the semiconductor memory device shown in FIG. 6.

FIG. 7 shows a memory cell control block of the semiconductor memory device shown in FIG. 6. In FIG. 7, a reference numeral 3i denotes a write data decoder circuit.

As shown in FIG. 7, the memory cell control block (5i) comprises a data bus amplifier 15i, a write amplifier 17i, a write data control unit 21i, and a write data decoder circuit 3i.

Next, an error correction operation of the semiconductor memory device will be explained.

First, with reference to FIGS. 6 and 7, data output from each data bus amplifier 15i is supplied to the syndrome generation circuit 202 which is formed under a portion of the common data bus lines COMD in a longitudinal direction, and syndrome (SYND) is generated by the syndrome generation circuit 202 and supplied to the syndrome decoder circuit 203. The syndrome is decoded by the syndrome decoder circuit 203 and supplied to the ECC circuit 201, so that an error correction of the common data bus (COMD) selected by the common data bus selection circuit 4i is carried out and the corrected data is output externally.

Note, syndrome generated by the syndrome generation circuit 202 is supplied to the syndrome decoder 2i of each memory cell control block 5i (51 to 5g), and the syndrome is decoded and data correction of the erroneous data is corrected through data bus lines (DBi, DBi#) and sense amplifier (12i) by the syndrome decoder circuit 2i and the write data control unit 21i.

Figure 8:
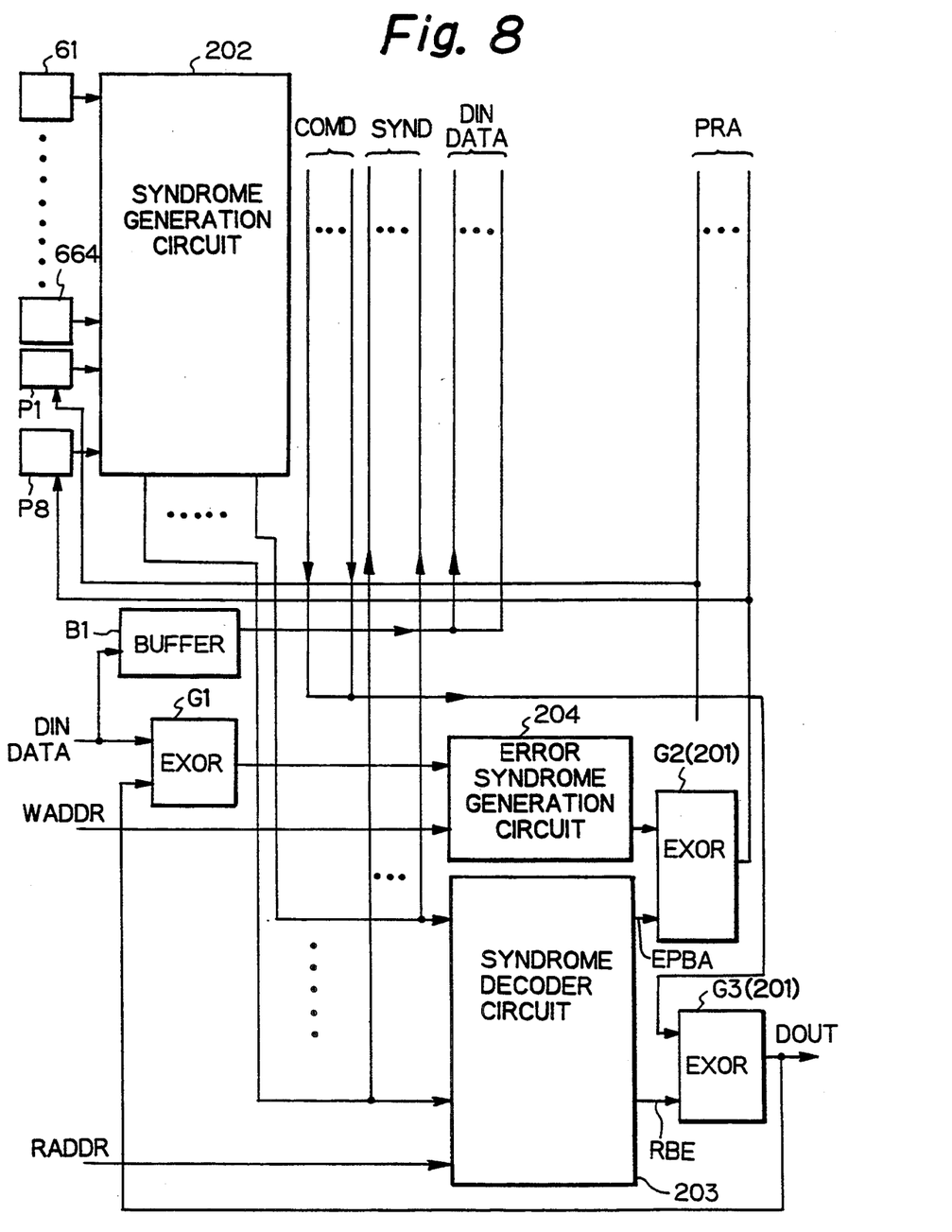
FIG. 8 is a block diagram showing the semiconductor memory device shown in FIG. 6 for explaining operations thereof.
Figure 9:
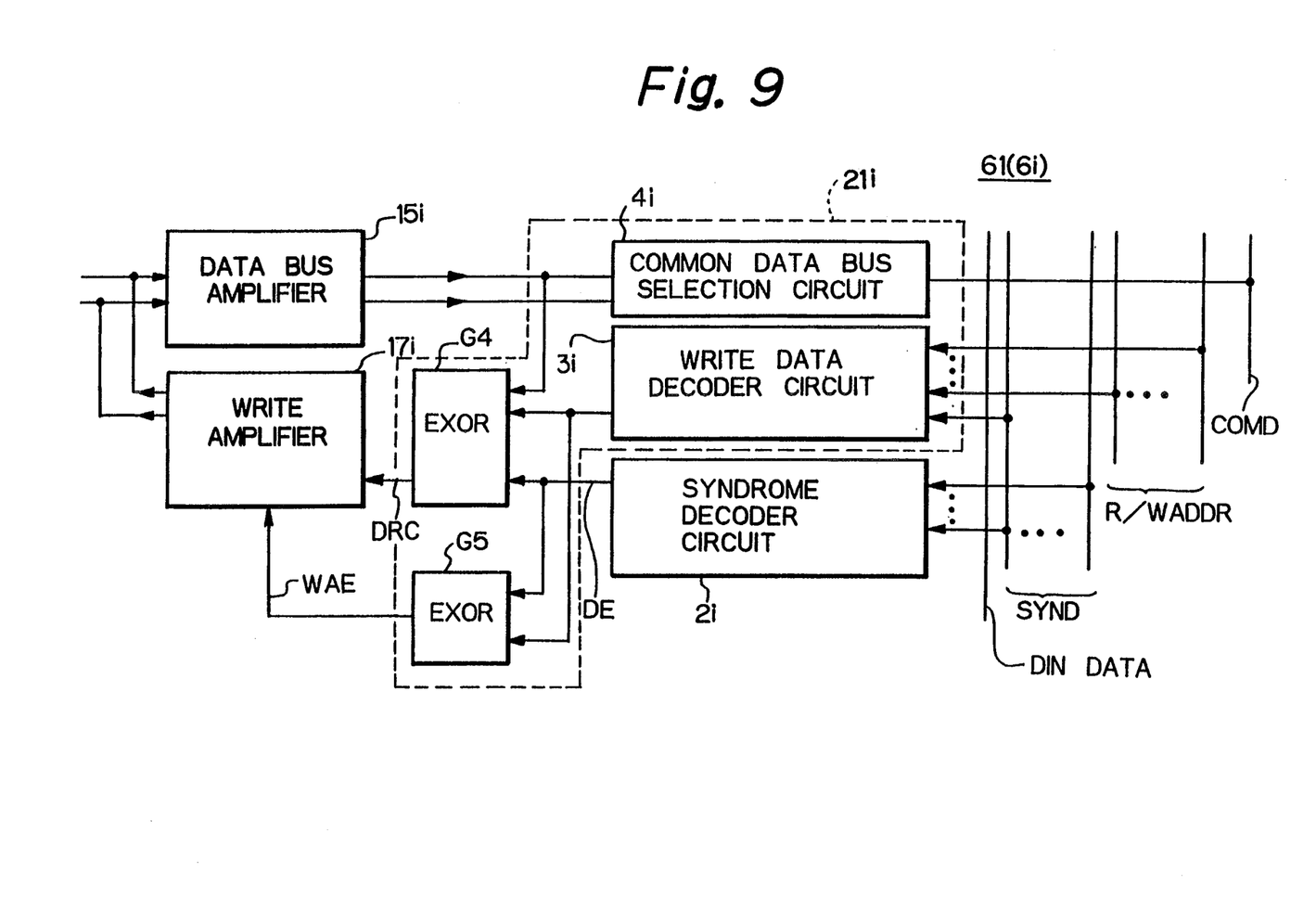
FIG. 9 is a block diagram showing the memory cell control block in the semiconductor memory device shown in FIG. 8 for explaining data bits.
Figure 10:
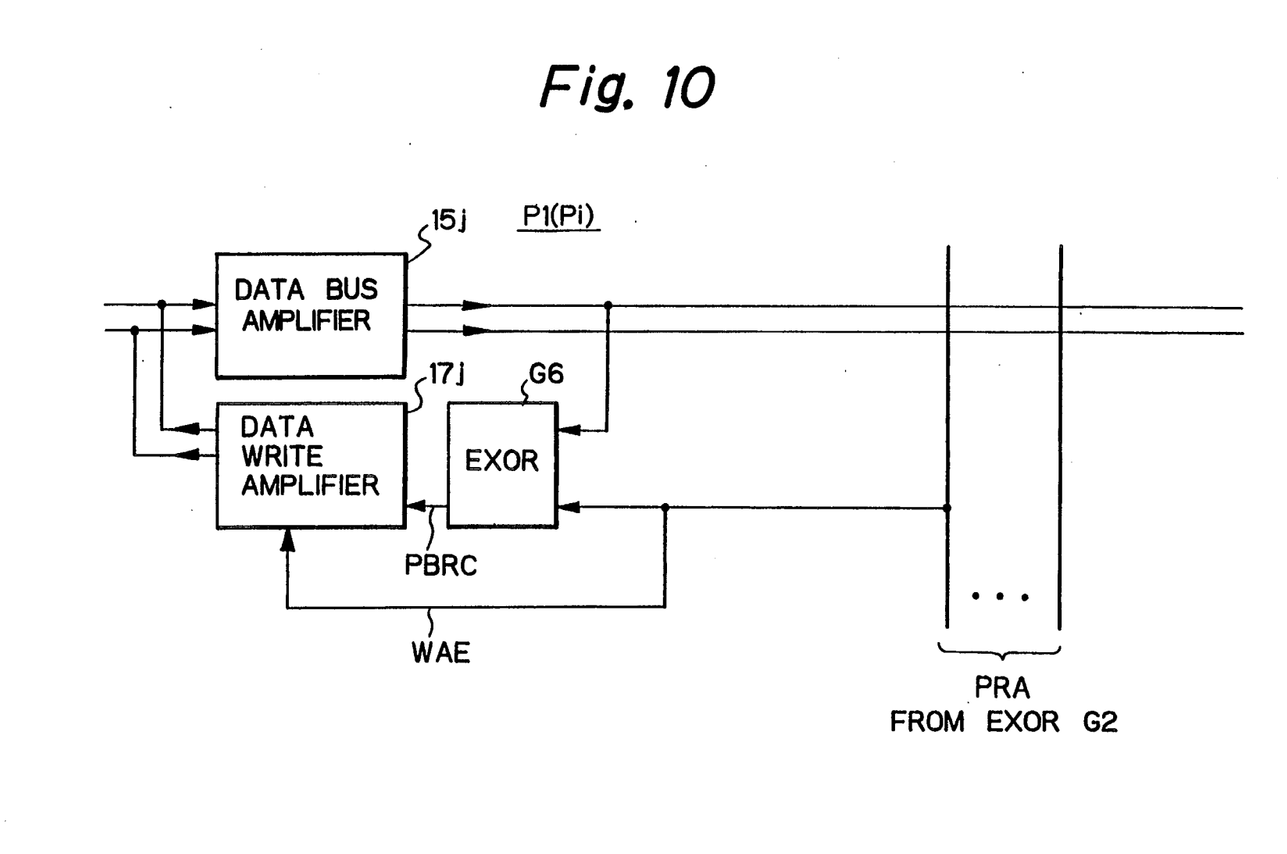
FIG. 10 is a block diagram showing the memory cell control block in the semiconductor memory device shown in FIG. 8 for explaining parity bits.

FIG. 8 shows the semiconductor memory device shown in FIG. 6 for explaining operations thereof, FIG. 9 shows the memory cell control block in the semiconductor memory device shown in FIG. 8 for explaining data bits, and FIG. 10 shows the memory cell control block in the semiconductor memory device shown in FIG. 8 for explaining parity bits.

In FIG. 8, reference numerals 61 to 664 denotes memory cell control units relating to each data bit, and each memory cell control unit (6i) includes a data bus amplifier 15i, a write amplifier 17i, a syndrome decoder circuit 2i, and a write data control unit 21i, as shown in FIG. 9. The write data control unit 21i comprises a common data bus selection circuit 4i, a write data decoder circuit 3i, and EXOR gates G4 and G5. Further, in FIG. 8, references P1 to P8 denote memory cell control units relating to each parity bit, and each memory cell control unit (Pi) includes a data bus amplifier 15i, a write amplifier 17i, and an EXOR gate G6, as shown in FIG. 9. Further, in FIG. 8, reference B1 denotes a buffer for storing data (DIN DATA) to be written into the memory cell, G1 to G3 denote EXOR gates.

First, when a reading operation is carried out, data amplified by the data bus amplifier 15i is supplied to the syndrome generation circuit 202, and thereby syndrome SYND is generated. This syndrome SYND is decoded by the syndrome decoder circuit 203, and thereby a read bit error signal RBE is generated. In the EXOR gate G3, data of the common data bus COMD selected by read address RADDR is corrected in accordance with the read bit error signal RBE, and the corrected data (DOUT) is output through an output circuit (not shown) to a destination external to the chip.

Simultaneously, as shown in FIGS. 8 and 9, the syndrome SYND generated by the syndrome generation circuit 202 is also supplied to the memory cell control units 61 to 664 (6i) relating to each data bit. This memory cell control unit 6i includes the syndrome decoder circuit 2i, the syndrome is decoded by the syndrome decoder circuit 2i, and thereby a data bit error signal DE is generated. This data bit error signal DE is supplied to the EXOR gate G4, and a data bit inversion control signal DRC is generated from the EXOR gate G4 and supplied to the write amplifier 17i. Further, the data bit error signal DE is also supplied to the EXOR gate G5, and a write amplifier activation signal WAE is generated from the EXOR gate G5 and supplied to the write amplifier 17i. Therefore, when an error bit is detected (checked) by the syndrome decoder circuit 2i, the corresponding write amplifier 17i is activated in accordance with the write amplifier activation signal WAE, and data is inverted and rewritten into the memory cell through the data bus lines DBi, DBi# and the sense amplifier (12i) in accordance with the data bit inversion control signal DRC.

As shown in FIGS. 8 and 10, the parity bits are decoded by the syndrome decoder circuit 203 provided at the center of the chip, which is the same as that of the prior art, and thereby a parity bit inversion signal PRA is generated. The write amplifier 17i is activated by the parity bit inversion signal PRA (write amplifier activation signal WAE), the parity bit to be required for data inversion is selected by a parity bit inversion control signal PBRC output from the EXOR gate G6.

Next, as shown in FIGS. 8 and 9, when a writing operation is carried out, syndrome SYND generated by the syndrome generation circuit 202 is supplied to the memory cell control units 61 to 664 (6i) relating to each data bit. The syndrome is decoded by the syndrome decoder circuit 2i of the memory cell control unit 6i, and thereby a data bit error signal DE is generated. This data bit error signal DE is supplied to the EXOR gate G4, and a data bit inversion control signal DRC is generated from the EXOR gate G4 and supplied to the write amplifier 17i by carrying out an exclusive-or operation of the data bit error signal DE, the read data output from the data bus amplifier 15i, and the write data output from the write data decoder circuit 3i. Further, the data bit error signal DE is also supplied to the EXOR gate G5, and a write amplifier activation signal WAE is generated from the EXOR gate G5 and supplied to the write amplifier 17i by carrying out an exclusive-or operation of the data bit error signal DE and the write data output from the write data decoder circuit 3i. Therefore, when an error bit is detected by the syndrome decoder circuit 2i, the corresponding write amplifier 17i is activated by the write amplifier activation signal WAE, and data is inverted and rewritten into the memory cell through the data bus lines DBi, DBi# and the sense amplifier (12i) by the data bit inversion control signal DRC.

As shown in FIGS. 8 and 10, the parity bits are decoded by the syndrome decoder circuit 203 provided at the center of the chip, which is the same as that of the prior art, and thereby a parity bit inversion signal PRA is generated. The write amplifier 17i is activated by the parity bit inversion signal PRA (write amplifier activation signal WAE). When read data where the error correction operation is carried out is coincident with write data, the parity bit is selectively written by the parity bit inversion signal PRA. On the other hand, when read data where the error correction operation is carried out is not coincident with write data, the parity bit is selectively written by the parity bit inversion control signal PBRC output from the EXOR gate G6. Note, the parity bit inversion control signal PBRC is generated by carrying out an exclusive-or operation between the parity bit inversion signal PRA and the error syndrome in the EXOR gate G6.

As explained above, in the semiconductor memory device according to the present invention, each memory control block includes a data bus amplifier, a write amplifier, and a syndrome decoder circuit which decodes syndrome output from the syndrome generation circuit. In the semiconductor memory device according to the present invention, only the write amplifiers required to rewrite the inversion data are activated, and the other write amplifiers are not activated, so that power consumption of the semiconductor memory device can be reduced. Further, the number of the common data bus lines can be decreased, for example, the number of the common data bus lines is only specified as 8, and thus the number of the common data bus lines can be decreased from 64 to 8, so that an occupancy area of the common data bus lines can be small and the total power consumption can be also decreased.

Many different embodiments of the present invention may be constructed without departing from the spirit and scope of the present invention, and it should be understood that the present invention is not limited to the specific embodiments described in this specification, except as defined in the appended claims.

I claim:

1. A semiconductor memory device connected to a data bus to receive data therefrom or send data thereto, comprising:
  a cell and amplifier portion having a memory cell array, a sense amplifier array, and a column gate array, for storing data;

a syndrome generation circuit for generating a syndrome of data received from the data bus;

an error checking and correction circuit, for correcting an error of said data received from the data bus;

a plurality of memory control blocks connected to said syndrome generation circuit, each having a data bus amplifier for reading data from said memory cell array, a write amplifier for writing data into said memory cell array, a first syndrome decoder circuit for decoding said generated syndrome from said syndrome generation circuit and generating a signal for requesting an inversion of the read-out data, and a write data control unit connected to receive output signal from said first syndrome decoder circuit, and the output of the data bus amplifier, said write data control circuit generating a data inversion control signal when a write enable signal supplied thereto; said write amplifier being connected to receive said data inversion control signal, and being responsive to said control signal to invert and write data into said memory cell array in response to said output signal from said first syndrome decoder circuit; and a second syndrome decoder circuit for decoding said generated syndrome from said syndrome generation circuit, and said error checking and correction circuit corrects said data received from the data bus in response to an output signal of said second syndrome decoder circuit.

2. A semiconductor memory device as claimed in claim 1, wherein said write data control unit controls said write amplifier to selectively enable said write amplifier to perform a data inversion.

3. A semiconductor memory device as claimed in claim 1, wherein said semiconductor memory device is a dynamic random access memory device, and each memory cell of said memory cell array comprises a transistor and a capacitor.

* * * * *